United States Patent [19]

Konya et al.

[11] Patent Number: 5,618,498

[45] Date of Patent: Apr. 8, 1997

[54] METHOD FOR BRAZING HEAT RESISTING ALLOY HAVING ON ITS SURFACE INSULATING OXIDE FILM AND PREHEAT TYPE METALLIC CARRIER FOR PURIFICATION OF EXHAUST GAS AND PROCESS FOR PRODUCING THE SAME

[75] Inventors: Shogo Konya, Kawasaki; Akira Okamoto, Ube; Kouji Yoshizaki, Numazu, all of Japan

[73] Assignees: Nippon Steel Corporation, Tokyo; Toyota Jidosha Kabushiki Kaisha, Toyota, both of Japan

[21] Appl. No.: 367,274

[22] PCT Filed: May 12, 1994

[86] PCT No.: PCT/JP94/00772

§ 371 Date: Jan. 12, 1995

§ 102(e) Date: Jan. 12, 1995

[87] PCT Pub. No.: WO94/26455

PCT Pub. Date: Nov. 24, 1994

[30] Foreign Application Priority Data

May 12, 1993 [JP] Japan ................... 5-110468

[51] Int. Cl.$^6$ ........................ F01N 3/10; B23K 31/02
[52] U.S. Cl. ................. 422/174; 422/173; 422/177; 422/180; 422/199; 422/211; 422/222; 29/890; 228/124.5; 228/121; 228/181; 428/116; 428/593; 428/594
[58] Field of Search ..................... 422/173–175, 422/177, 180, 198, 199, 211, 222; 228/124.5, 121, 219, 181; 29/890; 502/439, 527; 428/593–594, 116

[56] References Cited

U.S. PATENT DOCUMENTS 3,768,982  10/1973  Kitzner et al. ................. 422/174
3,770,389  10/1973  Kitzner et al. ................. 422/174

(List continued on next page.)

FOREIGN PATENT DOCUMENTS

| 0213435 | 3/1987 | European Pat. Off. . |
| 0503445 | 9/1992 | European Pat. Off. . |
| 0507216 | 10/1992 | European Pat. Off. . |
| 62-47716 | 3/1987 | Japan . |
| 2-26643 | 1/1990 | Japan . |
| 3-500911 | 2/1991 | Japan . |
| 3-501363 | 3/1991 | Japan . |
| 5-59939 | 3/1993 | Japan . |
| 5-200306 | 8/1993 | Japan . |
| 5-200305 | 8/1993 | Japan . |
| 1492929 | 11/1977 | United Kingdom . |
| WOA92/18245 | 10/1992 | WIPO . |

OTHER PUBLICATIONS

Patent Abstracts of Japan, vol. •012, No. 155 (C–494), May 12, 1988 & JP–A–62 269750 (Nippon Radiator Co., Ltd.), Nov. 24, 1987.

*Primary Examiner*—Robert J. Warden
*Assistant Examiner*—Hien Tran
*Attorney, Agent, or Firm*—Kenyon & Kenyon

[57] ABSTRACT

The present invention aims to produce a metallic carrier which enables a catalyst to be activated in a short time. In mutually joining an insulated heat resisting alloy and a heat resisting alloy having an insulating film, particularly composed mainly of alumina, a joining material of a laminate, formed by laminating a strongly reducing metal, which can thermodynamically reduce alumina, and a brazing material to each other, is disposed so that the strongly reducing metal comes into contact with the insulated heat resisting alloy, and the resultant laminate is heated in a non-oxidizing atmosphere to carry out a brazing treatment. This enables only portions in the honeycomb structure, where electrically conductive paths are to be formed, can be joined, and, at the same time, heat resisting alloys having a surface covered with an insulating oxide film can be firmly joined with the resultant joint having an electrical conductivity. The above joining method can be utilized to provide a preheat type metallic carrier having an excellent conversion efficiency, wherein only a surface layer portion on the side of an inlet for an exhaust gas can be heated.

16 Claims, 10 Drawing Sheets

U.S. PATENT DOCUMENTS

| | | | |
|---|---|---|---|
| 4,901,904 | 2/1990 | Tsuno | 228/124.5 |
| 4,928,485 | 5/1990 | Whittenberger | 422/174 |
| 4,958,428 | 9/1990 | Humpolik | 422/180 |
| 5,050,790 | 9/1991 | Takikawa et al. | 228/181 |
| 5,063,029 | 11/1991 | Mizuno et al. | 422/174 |
| 5,070,694 | 12/1991 | Whittenberger | 422/174 |
| 5,094,074 | 3/1992 | Nishizawa et al. | 422/174 |
| 5,140,813 | 8/1992 | Whittenberger | 422/174 |
| 5,146,743 | 9/1992 | Maus et al. | 422/174 |
| 5,174,968 | 12/1992 | Whittenberger | 422/174 |
| 5,215,722 | 6/1993 | Nishizawa | 422/174 |

5,618,498

METHOD FOR BRAZING HEAT RESISTING ALLOY HAVING ON ITS SURFACE INSULATING OXIDE FILM AND PREHEAT TYPE METALLIC CARRIER FOR PURIFICATION OF EXHAUST GAS AND PROCESS FOR PRODUCING THE SAME

TECHNICAL FIELD

The present invention relates to a method for brazing a heat resisting alloy, more specifically a heat resisting alloy having on its surface an insulating oxide film, and a metallic carrier for the purification of an exhaust gas, which metallic carrier has an excellent conversion efficiency and is produced using said brazing method.

BACKGROUND ART

A three way catalyst of Pt, Rh, Pd, or the like has been generally used as a catalyst for the purification of an automobile exhaust gas. In order for the catalyst to function, the catalyst should be heated to a temperature of about 350° to 400° C. For catalytic converters in current extensive use, a catalyst is supported on a ceramic carrier or a metallic carrier, and the catalyst is heated and activated by taking advantage of heat energy of the exhaust gas per se. This is disadvantageous in that much time is taken for the catalyst to function after the start of an engine, resulting in poor conversion efficiency immediately after the start of the engine.

Accordingly, in the background of tightening of exhaust gas regulations in recent years, catalytic converters having an excellent conversion efficiency immediately after the start of an engine, i.e., at the time of start of a cold engine, have been desired in that art. One method for meeting this demand comprises forming an insulating film on at least one of a flat sheet (a thin flat sheet) and a corrugated sheet (a thin corrugated sheet) in a honeycomb structure constituting a metallic carrier, winding the flat sheet and the corrugated sheet in a mutually electrically insulated state, and conducting energization in a spiral direction to generate Joule heat which forcibly heats the catalyst, thereby shortening the time taken for the temperature of the catalyst to reach a value at which the catalyst functions.

PCT Publication No. 3-500911 published in Japan discloses a metallic carrier, having a resistance value suitable for electric heating, wherein an insulating layer is provided in a honeycomb structure comprising a flat sheet and a corrugated sheet. One example of the structure disclosed in the above publication is shown in FIG. 1. In such a structure, insulating layers 180 are disposed at proper intervals in a honeycomb structure 151 to form a current path as indicated by an arrow. The electric power consumed in the current path is regulated to 50 to 500 W which is an electric power that can be supplied from a battery for automobiles without difficulties. However, the whole honeycomb structure is electrically heated as in the above case where an insulating film is provided on the flat sheet and the corrugated sheet, so that much time is taken for the temperature to reach a desired value.

Japanese Unexamined Patent Publication (Kokai) No. 5-59939 discloses a metallic carrier having such a construction that a heater is buried in a honeycomb structure. In this construction, only the buried heater is electrically heated. In fact, however, a combustion reaction represented, for example, by $2CO+O_2=2CO_2$ occurs upon the initiation of a catalytic reaction. This reaction is an exothermic reaction and generates a large quantity of heat. Specifically, when only a portion of the honeycomb structure is heated to a temperature at which the catalyst supported on the metallic carrier functions, the occurrence of a reaction in the heated portion enables the other portions to be spontaneously and rapidly heated by virtue of the heat of reaction. In this case, the electrically heated volume is smaller than that in the above-described prior art, so that when the same electric power is applied, the temperature of the catalyst in the heated portion reaches, in a shorter time, a value at which the catalyst functions.

Although the method described in Japanese Unexamined Patent Publication (Kokai) No. 5-59939 has an excellent function, it has a drawback that in the production of the metallic carrier, the process is complicated because after a honeycomb having a hole or a groove for burying a heating heater therein is produced, a heater fabricated so as to have a shape corresponding to the hole or groove should be buried in the hole or groove.

The present invention solves the above problems particularly in a preheat type metallic carrier.

Specifically, an object of the present invention is to strongly join a heat resisting alloy having on its surface an insulating film (hereinafter referred to as "insulated heat resisting alloy").

Another object of the present invention is to impart good electric conductivity to a joint of an insulated heat resisting alloy.

Another object of the present invention is to provide a preheat type metallic carrier, for a catalyst for the purification of an exhaust gas, having a honeycomb structure comprising a flat sheet and a corrugated sheet, at least one of which is made of an insulated heat resisting alloy, which metallic carrier enables the inside of the honeycomb structure to be energized through a very simple structure.

A further object of the present invention is to make it possible for a metallic carrier to be preheated by energizing a part of the inside of the above honeycomb structure.

A further object of the present invention is to sufficiently join the flat sheet and the corrugated sheet to each other in the above honeycomb structure.

CONSTITUTION OF INVENTION

In order to attain the above objects, the present invention provides the following techniques.

In a honeycomb structure comprising a flat sheet and a corrugated sheet, at least one of which is covered with an insulating film to electrically insulate the flat sheet and the corrugated sheet from each other, if joining could be carried out by brazing so that a portion between the flat sheet and the corrugated sheet is electrically conductive, it becomes possible to form such a honeycomb structure that only a path having the joint serves as a heat generating portion.

However, the brazing process commonly used in the art is limited to brazing between heat resisting alloys having on its surface no insulating film. This is because the presence of an insulating film inhibits fusing between the brazing material and the heat resisting alloy even when the brazing material is melted. For this reason, a technique is necessary where a heat resisting alloy having on its surface an insulating film (an insulated heat resisting alloy) can be strongly joined so that the resultant joint is electrically conductive.

In order to solve the above problems, according to the present invention, when an insulated heat resisting alloy (for example, an Al-containing heat resisting alloy) and a heat resisting alloy are mutually joined, a joining material of a laminate comprising a strongly reducing metal (for example, Zr) and a brazing material is used in such a manner that after the joining material is disposed for the surface of the strongly reducing metal to face the insulated heat resisting alloy, thereby forming a laminate which is then heated in a nonoxidizing atmosphere to carry out a brazing treatment.

When insulated heat resisting alloys are mutually joined, a joining material comprising a brazing material inserted between a pair of strongly reducing metals is used to prepare a laminate which is then heated in a non-oxidizing atmosphere to carry out a brazing treatment.

The above joining methods enable the construction of a metallic carrier wherein a honeycomb structure comprising a corrugated sheet and a flat sheet, at least one of which is made of an insulated heat resisting alloy, has an electrically conductive joint.

BRIEF DESCRIPTION OF THE DRAWINGS

FIG. 4 (b) is a cross-sectional view taken from line A—A of FIG. 4 (a);

BEST MODE FOR CARRYING OUT THE INVENTION

The best mode for carrying out the invention will now be described.

In order to insulate heat resisting alloys from each other, at least one of a corrugated sheet and a flat sheet may be covered with an insulating film. The insulating film may be formed by conventional methods, such as PVD, CVD, spray coating of ceramic, or coating of ceramic powder. A more preferred method is to use as the heat resisting alloy an Al-containing heat resisting alloy which is oxidized at a high temperature of 1000° C. or above (below the melting point) to form an oxide film on the surface thereof. When an Al-containing heat resisting alloy is oxidized at a high temperature, an oxide film, composed mainly of alumina, which is dense, has a good adhesion and a high insulating property. However, joining between an insulated heat resisting alloy and a heat resisting alloy or joining between insulated heat resisting alloys, as described above, cannot be successfully made by brazing commonly used in the art.

The present inventors have repeated experiments and research and, as a result, have found that the disposition of a joining material of a laminate comprising a metal, which can thermodynamically reduce an insulating film (hereinafter referred to as "strongly reducing metal"), and a brazing material is disposed between an insulated heat resisting alloy and a heat resisting alloy so that the strongly reducing metal (for example a foil) comes into contact with the insulated heat resisting alloy, followed by heating of the resultant laminate in a non-oxidizing atmosphere causes the strongly reducing metal foil to reduce the insulating film, creating a strength at a joint comparable to that in the case where heat resisting alloys having no insulating film are joined by brazing and, at the same time, enabling the resultant joint to serve as an electrically conductive path.

The above joining mechanism will now be described for the case where an oxide film composed mainly of alumina was used as the insulating film and Zr was used as the strongly reducing metal. At the outset, alumina as the main component of the insulating film and the Zr foil give rise to a substitution reaction represented by the following formula:

$$2/3Al_2O_3 + Zr = 4/3Al + ZrO_2$$

At the same time, the brazing material melts. The $ZrO_2$ thus produced is dispersed and precipitated in the melted brazing material. The melted brazing material is alloyed with Zr and passed through between gaps of the dispersed and precipitated $ZrO_2$, and reaches the substrate of the insulated heat resisting alloy, thereby successfully carrying out joining through the same mechanism as the conventional brazing. The simultaneously formed Al is dissolved in the brazing material or diffuses into the insulated heat resisting alloy. By virtue of the above mechanism, the insulated heat resisting alloy is joined and, at the same time, the resultant joint is electrically conductive.

Figure 2:
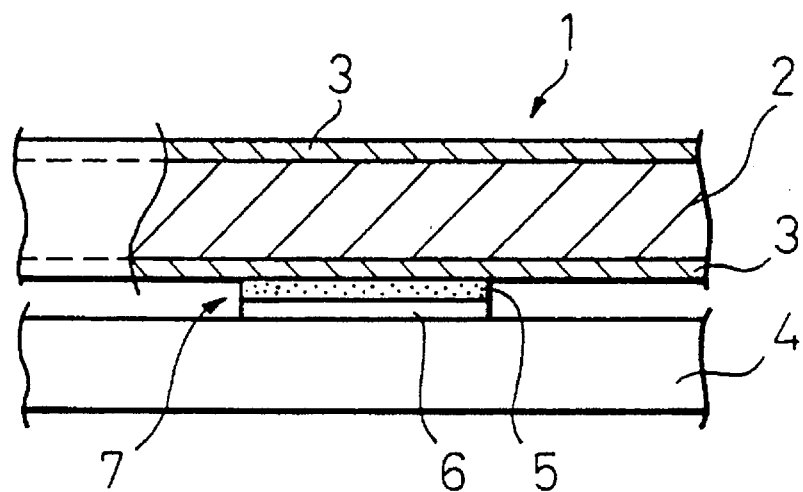
FIG. 2 is a front view partly in section showing an embodiment of the laminate of the present invention.
Figure 3:
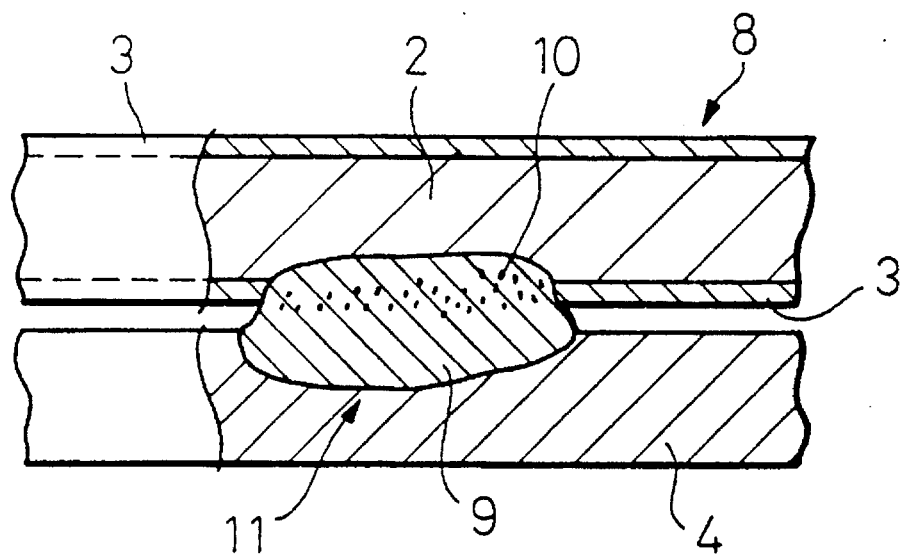
FIG. 3 is a schematic front view partly in section showing a joint formed in the joining of the laminate shown in FIG. 2.

The specific constitution of the present invention will now be described. FIG. 2 is a schematic view partly in section of a laminate for explaining an embodiment of the joining method according to the present invention, and FIG. 3 is a cross-sectional view partly in section of a joined product formed based on the laminate shown in FIG. 2.

In FIG. 2, numeral 2 designates an insulated heat resisting alloy with an insulating film 3 composed mainly of alumina (hereinafter referred to simply as "oxide film") being formed thereon. Numeral 4 designates a heat resisting alloy the surface of which has not been oxidized (hereinafter referred to as "heat resisting alloy"). The oxide film 3 is preferably formed by heating in an oxidizing atmosphere from the viewpoint of simplifying the process. A particularly preferred process is to heat the heat resisting alloy in air. In this case, the insulated heat resisting alloy 2 should contain Al.

Numeral 7 designates a joining material formed by laminating a strongly reducing metal 5 and a brazing material 6 to each other. The joining material 7 is disposed in such a manner that the strongly reducing metal 5 comes into contact with the oxide film 3, thereby constructing a laminate 1 comprising the insulated heat resisting alloy 2, the heat resisting alloy 4, and the joining material 7 inserted between the two alloys. The strongly reducing metal 5 is a metal which can reduce alumina, specifically at least one metal selected from Zr, Li, Be, Mg, Ca, Sr, Sc, Y, and lanthanoid elements with atomic numbers of 57 to 71. Further, the strongly reducing metal 5 may contain other elements than described above in such an amount that can reduce the oxide film 3. As compared with the other elements, Zr particularly has an advantage that it can be easily rolled to a foil, facilitating the formation of a joining material.

The laminate 1 is heated in a non-oxidizing atmosphere. This heating operation causes the brazing material 6 to be melted and, at the same time, the oxide film 3 to be reduced by the strongly reducing metal 5. Upon cooling, as shown in FIG. 3, a joint 11 is formed which has such a structure that an oxide 10 of a strongly reducing metal is dispersed and precipitated in a brazed portion 9. Further, the oxide film 3 disappears at the joint 11. The brazed portion 9 has such a structure that the strongly reducing metal is alloyed with the brazing material component. When an Ni—Si—Cr—base material is used as the brazing material with Zr being used as the strongly reducing metal, the brazed portion 9 has a structure composed mainly of two phases, i.e., a phase of Ni—Si—Zr and a phase of Cr.

Thus, the insulated heat resisting alloy 2 and the heat resisting alloy 4 are joined through a joint 11, thereby forming a joined product 8. Since the brazed portion 9 comprising metal components constitutes a matrix, the joint 11 can be energized and, therefore, can serve also as an electrically conductive path.

Joining between the insulated heat resisting alloy 2 and the heat resisting alloy 4 have been described above. The same technical means can be applied to joining between insulated heat resisting alloys. In this case, a laminate comprising two sheets of strongly reducing metals and, inserted therebetween, a brazing material may be used as the joining material. The joining mechanism is the same as that described above.

Figure 4A:
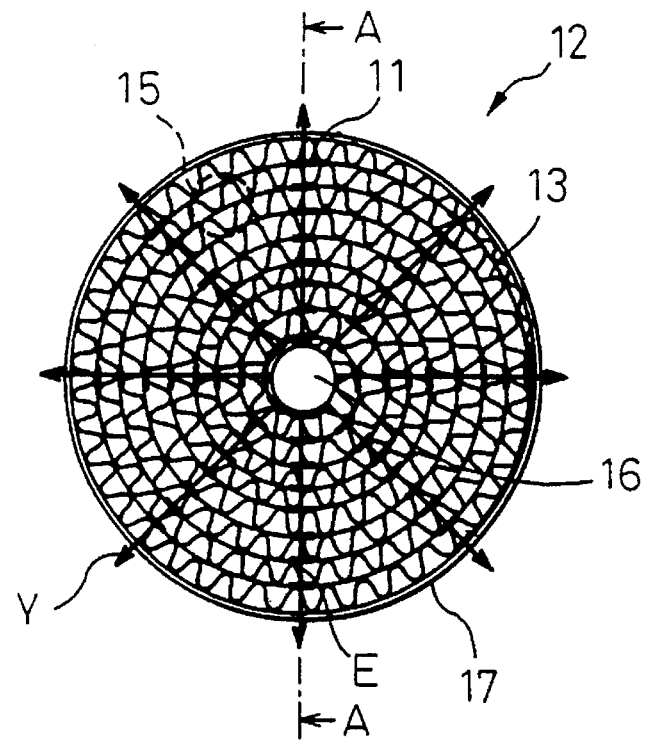
FIG. 4 (a) is a plan view of the metallic carrier of the present invention as viewed from the side of an inlet for an exhaust gas.
Figure 4B:
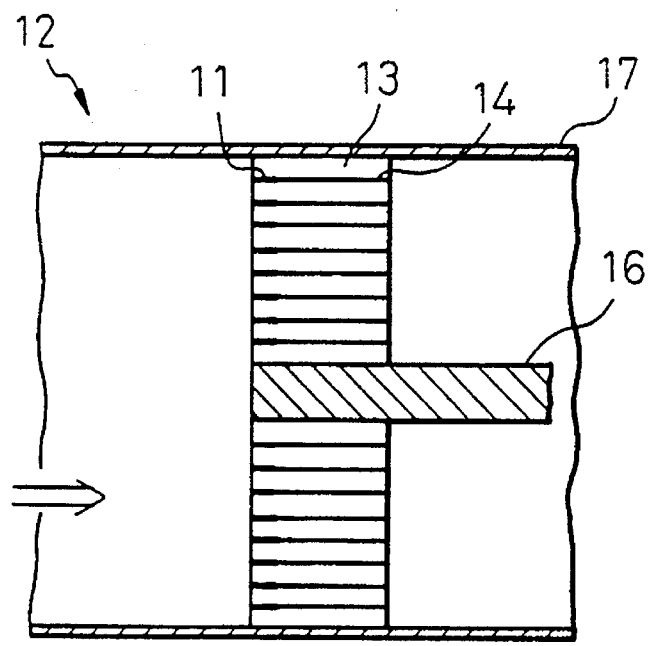

The preheat type metallic carrier for the purification of an exhaust gas as described above can be produced by utilizing the technical means according to the present invention. FIG. 4 (*a*) is a schematic plan view of the above metallic carrier, and FIG. 4 (*b*) is a cross-sectional view taken along line A—A of FIG. 4 (*a*). The metallic carrier 12 comprises, for example, a honeycomb structure 15 comprising a corrugated sheet 13 of an insulted heat resisting alloy and a flat sheet 14 of a heat resisting alloy, a central electrode rod 16, and a jacket 17, and has a joint 11 in the honeycomb structure in its portion on the side of an inlet for an exhaust gas.

In order to form the joint 11, before the heat treatment is carried out for brazing, a joining material 7 comprising a strongly reducing metal 5 and a brazing material 6 may be previously disposed between the corrugated sheet 13 and the flat sheet 14 in its portion where the formation of an electrically conductive path is contemplated.

Figure 5:
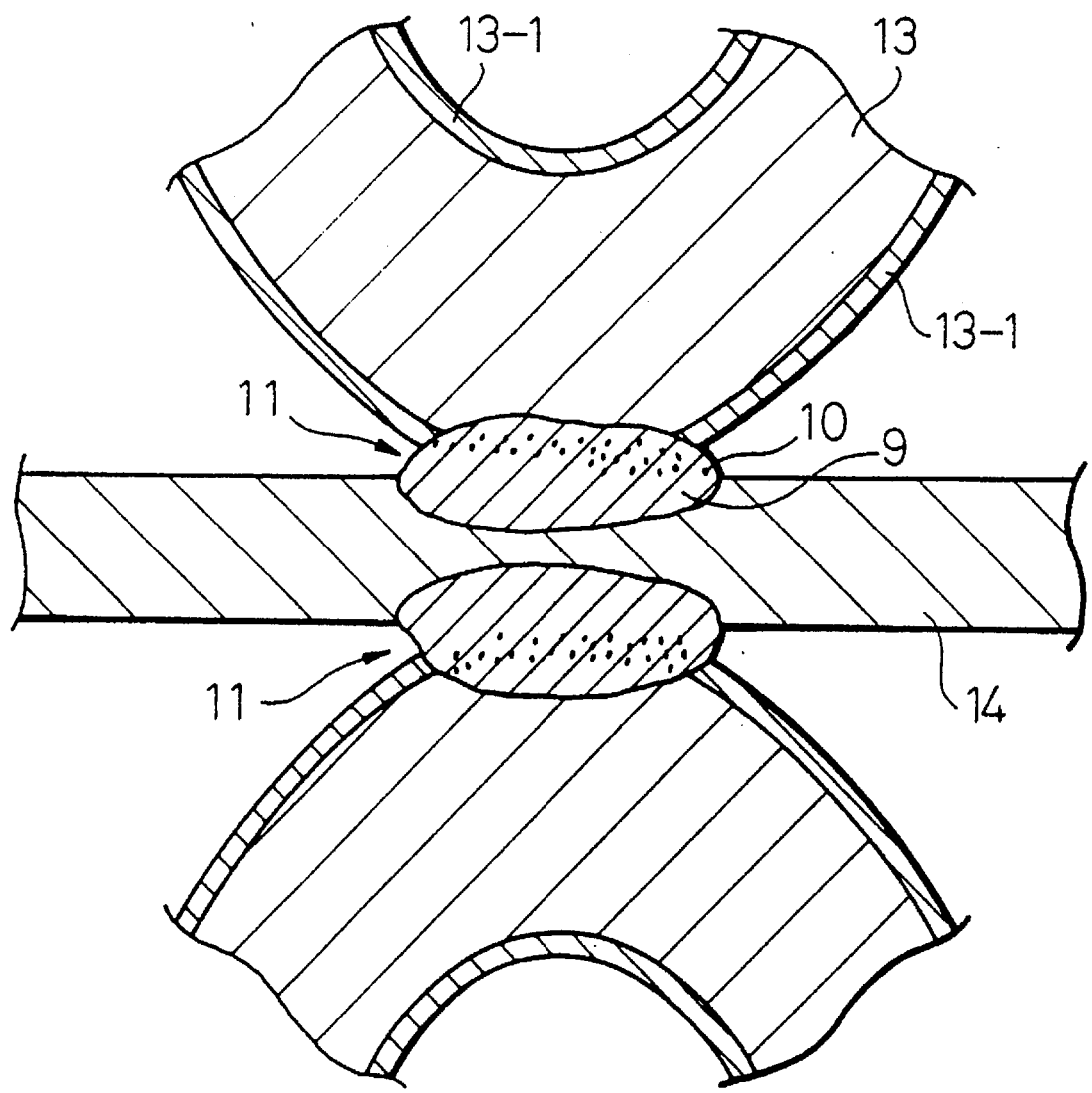
FIG. 5 is a schematic cross-sectional view of the metallic carrier shown in FIG. 4 (a) and FIG. 4 (b) in its portion in the vicinity of the joint.

FIG. 5 is a schematic enlarged view of a portion in the vicinity of the joint 11 shown in FIG. 4 (*a*) and FIG. 4 (*b*). As with the above embodiment, an oxide 10 of a strongly reducing metal is dispersed and precipitated L5 in a brazed portion 9. When a voltage is applied across the central electrode rod 16 of the metallic carrier 12 and the jacket 17, a current flows in a direction indicated by an arrow Y since the joint 11 serves as an electrically conductive path E, so that only the electrically conductive path E generates heat. As compared with the system where the whole metallic carrier is heated, the volume to be heated is so small that a catalyst can be heated, in a shorter time, to a temperature at which the catalyst functions.

When a catalyst is actually supported on the metallic carrier 12 and an exhaust gas is flowed simultaneously with energization, a reaction occurs in a short time after the initiation of energization. Thereafter, the heat of reaction rapidly spreads the reaction from the joint 11 to other portions.

Figure 6:
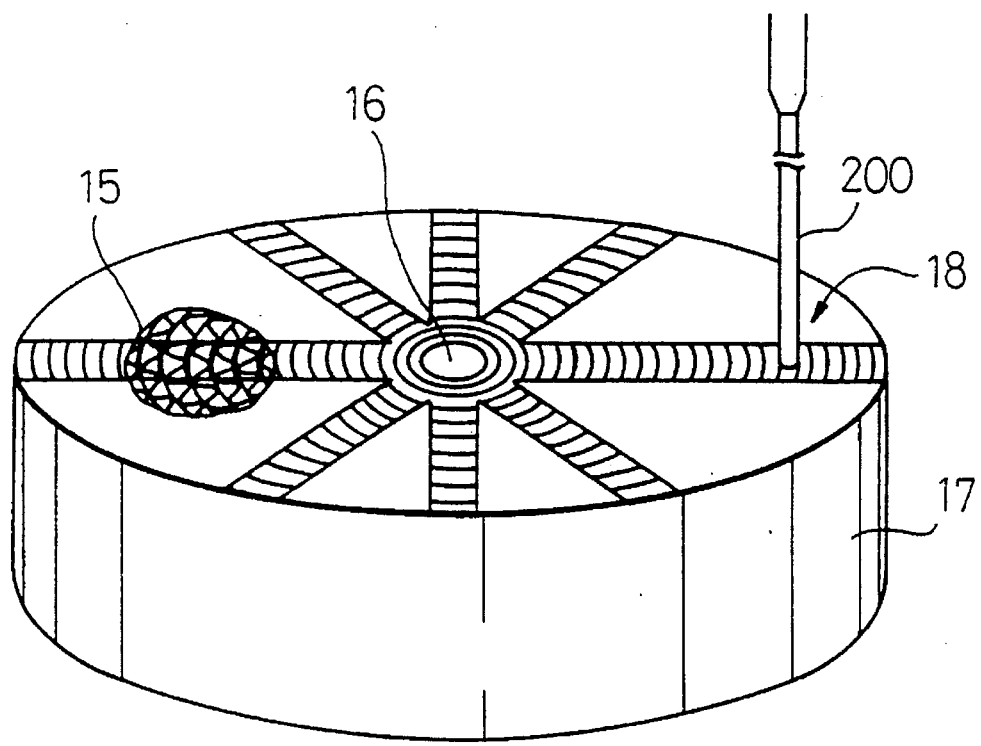
FIG. 6 is a perspective view of a metallic carrier having electrically conductive paths formed by laser beam welding.

Another advantage offered by the brazing process is that it is possible to obtain a joint having a shape and a size as desired. For example, when a honeycomb structure 15 is constructed without disposing any joining material and the honeycomb structure 15 at its end 18 is welded by means of a laser beam 200 or the like as shown in FIG. 6, an electrically conductive path can be formed. In this case, however, the weld depth is not uniform, causing the electrical resistance to vary from joint to joint and, therefore, the quantity of heat generated to vary from joint to joint. This leads to local abnormal heat generation, so that the joint is burnt off.

Although the present invention has been described in terms of an embodiment wherein the corrugated sheet 13 comprises an insulated heat resisting alloy and the flat sheet 14 comprises a heat resisting alloy, a combination of a heat resisting alloy as the corrugated sheet 13 with an insulated heat resisting alloy as the flat sheet 14 or a combination of an insulated heat resisting alloy as the corrugated sheet 13 with an insulated heat resisting alloy as the flat sheet 14 can be considered. In this case as well, a metallic carrier 12 having the same performance as that described above can be produced by selecting a joining material capable of providing contact of a strongly reducing metal 5 with an oxide film 13-1 to form a joint.

EXAMPLES

Example 1

The following test was carried out to confirm the expected effects of the present invention, i.e., the strength of a joint and the ability of a joint to be energized.

Figure 7:
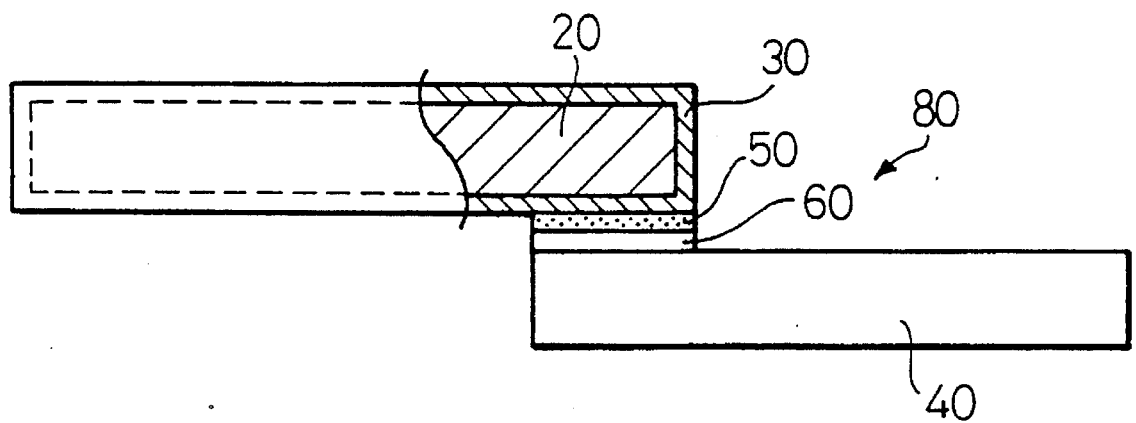
FIG. 7 is a front view partly in section showing another embodiment of the laminate of the present invention.
Figure 8:
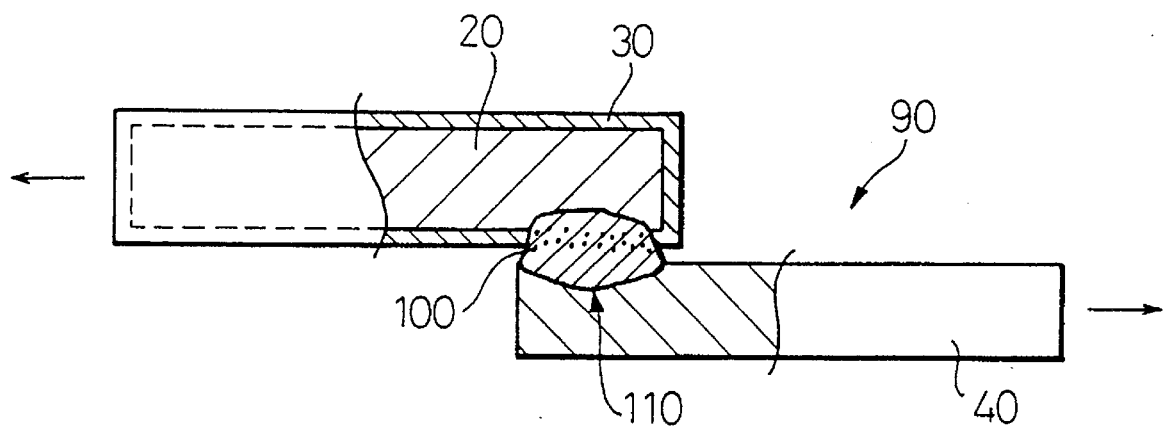
FIG. 8 is a schematic front view partly in section showing a joint formed in the joining of the laminate shown in FIG. 7.

As shown in FIG. 7, a SUS430 sheet 40 as a heat resisting alloy having a thickness of 1 mm, a length of 100 mm, and a width of 17 mm, a brazing material foil (Ni-19Cr-10Si-base material foil) 60, conforming to BNi-5 standard, having a length of 15 mm, a width of 15 mm, and a thickness of 25 μm, a Zr foil 50 as a strongly reducing metal having a length of 15 mm, a width of 15 mm, and a thickness of 5 μm, and an insulated heat resisting alloy sheet 20 of an Fe-20Cr-5Al-base material, having a length of 100 mm, a width of 17 mm, and a thickness of 1 mm, which had been heated in air at 1100° C. for 60 min to form on its surface a 1 μm-thick oxide film 30 composed mainly of alumina, were laminated in that order on top of one another to prepare a laminate 80. Thereafter, the laminate 80 was fixed using a fixture and heated in vacuo at a temperature of 1200° C. for 10 min, thereby preparing a joined product 90 shown in FIG. 8. In the drawing, numeral 100 designates an oxide of a strongly reducing metal, and numeral 110 a joint.

Thereafter, a load was applied, in directions indicated by arrows, to the joined product 90, that is, the heat resisting alloy 40 and the insulated heat resisting alloy 20, to measure the joint strength. As a result, the heat resisting alloy 40 was broken at a load of about 1000 kg with the joint 110 remaining sound. The oxide film 30 on the opposite side of the joint 110 of the insulated heat resisting alloy 20 was removed and tested for energization. As a result, it had a low resistance value of not higher than 1 m$\Omega$, i.e., a high electrical conductivity.

Further, the joint 110 was observed under a microscope. As a result, it was found that the oxide film 30 completely disappeared and the dispersion and precipitation of a Zr oxide 100 was observed.

Figure 9:
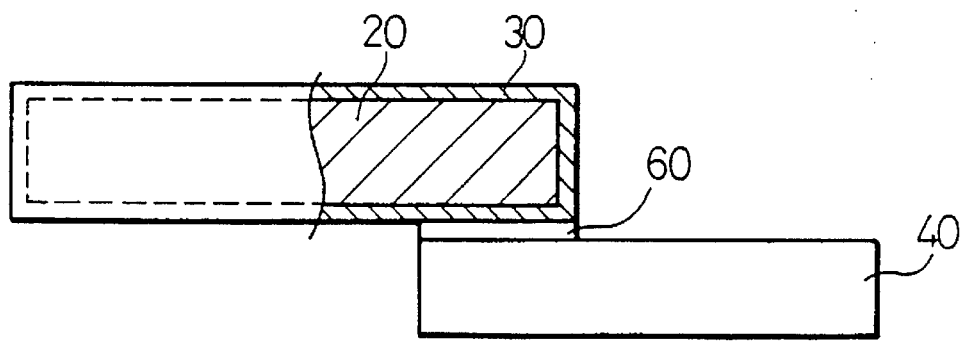
FIG. 9 is a front view partly in section of a comparative laminate.
Figure 10:
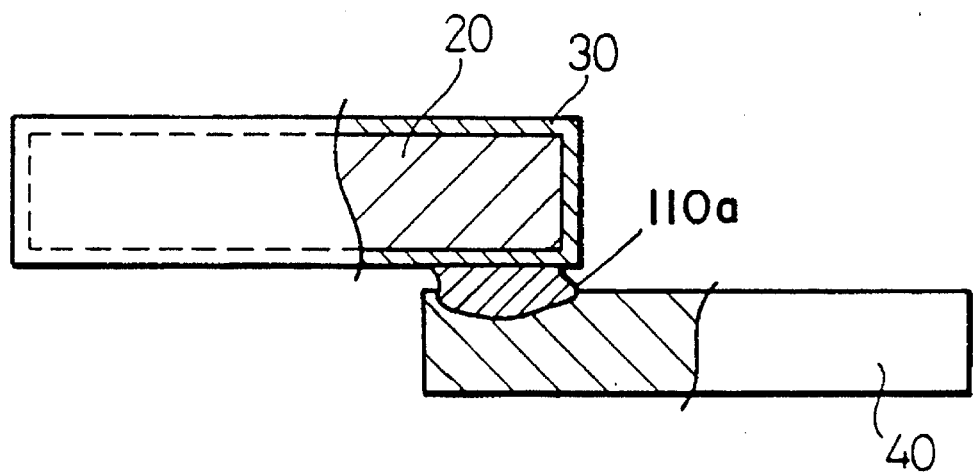
FIG. 10 is a schematic front view partly in section of a joint formed in the joining of the laminate shown in FIG. 9.

For comparison, as shown in FIG. 9, brazing was carried out using a brazing material 60 alone without use of any Zr foil 50. As a result, as shown in FIG. 10, the oxide film 30 at the joint 110a did not disappear, and the laminate was broken at a low load of about 100 kg. In this case, the broken site was the interface of the joint 110a and the oxide film 30.

Example 2

The procedure of Example 1 was repeated to carry out a test using the same construction as in Example 1, except that the strongly reducing metal was in the form of a sheet prepared by binding, with a binder, a powder of Mg as an element having a capability of thermodynamically reducing alumina and molding the mass into an about 20 µm-thick sheet. As a result, in the strength test, the heat resisting alloy 40 was broken at a load of 1000 kg, and the resistance value was not higher than 1 m$\Omega$. The joint had such a structure that the alumina film completely disappeared and the dispersion and precipitation of an oxide of Mg was observed.

For comparison, a 5 µm-thick foil of Ni as an element not having a capability of thermodynamically reducing alumina was used instead of the strongly reducing metal. As a results no reduction reaction of alumina occurred in the joint structure, and in the strength test, the heat resisting alloy was broken at a low load of 100 kg.

Example 3

Figure 11:
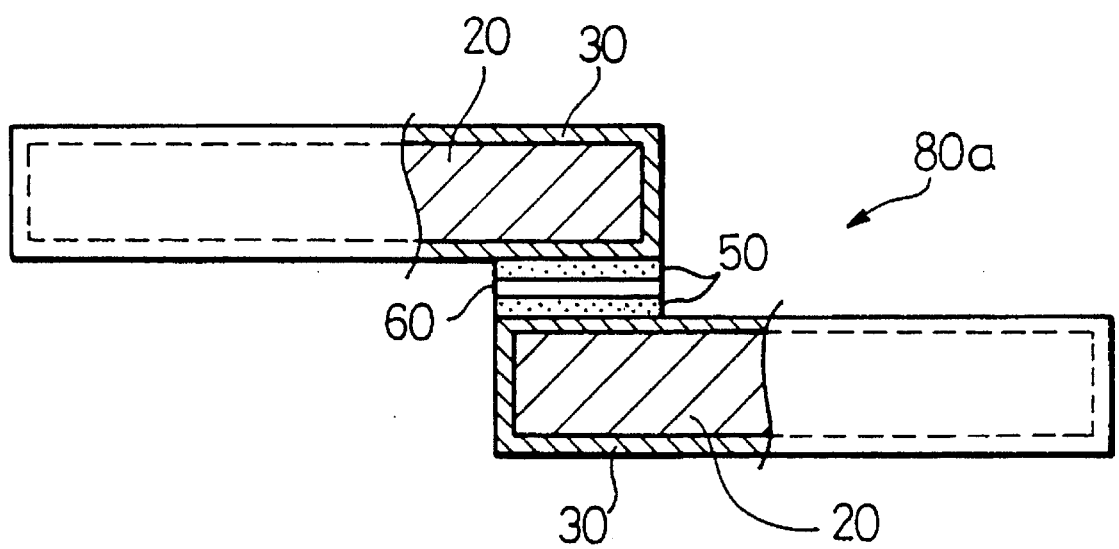
FIG. 11 is a front view partly in section showing a further embodiment of the laminate of the present invention.

As shown in FIG. 11, a pair of Zr foils 50 were inserted between a pair of Fe-20Cr-5Al-base insulated heat resisting alloy sheets 20 having a 1 µm-thick oxide film 30, and, further, a brazing material foil 60 conforming to BNi-5 standard was inserted between the pair of Zr foils 50 to prepare a laminate 80a having the same shape as the laminate prepared in Example 1. The laminate 80a was treated in the same manner as in Example 1, thereby preparing a joined product which was then tested. As a result, for this joint product as well, in the strength test, the insulated heat resisting alloy foil 20 was broken with the joint remaining sound. The resistance value was not higher than 1 m$\Omega$.

Example 4

Figure 12:
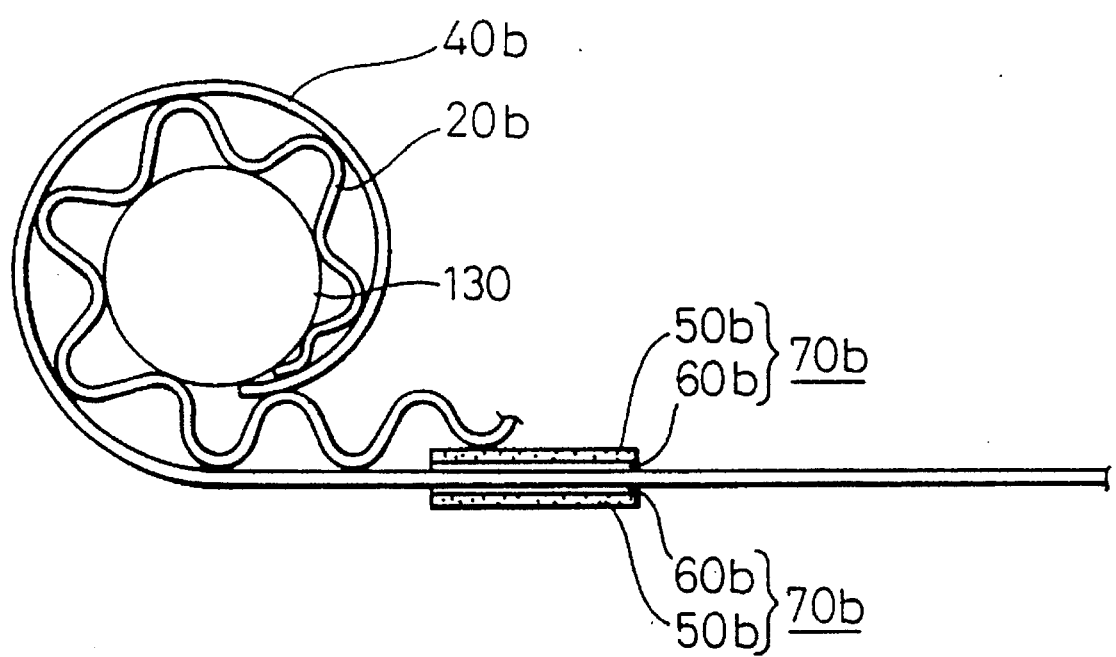
FIG. 12 is a schematic view showing the process of forming a metallic carrier according to the method of the present invention.

The process for producing a metallic carrier using the above-described joining means and the effect of the process will now be described. In FIG. 12, numeral 20b designates an insulated corrugated foil of an Fe—Cr—Al-base heat resisting alloy having a wave height of about 1 mm, a width of 17 mm, and a thickness of about 50 µm, numeral 40b a flat foil of an F—Cr—Al-base, Fe—Cr-base or other heat resisting alloy, and numeral 130 a central electrode. The insulated heat resisting alloy 20b and the heat resisting alloy foil 40b are fixed to a central electrode rod 130 by means of welding or the like.

Figure 13:
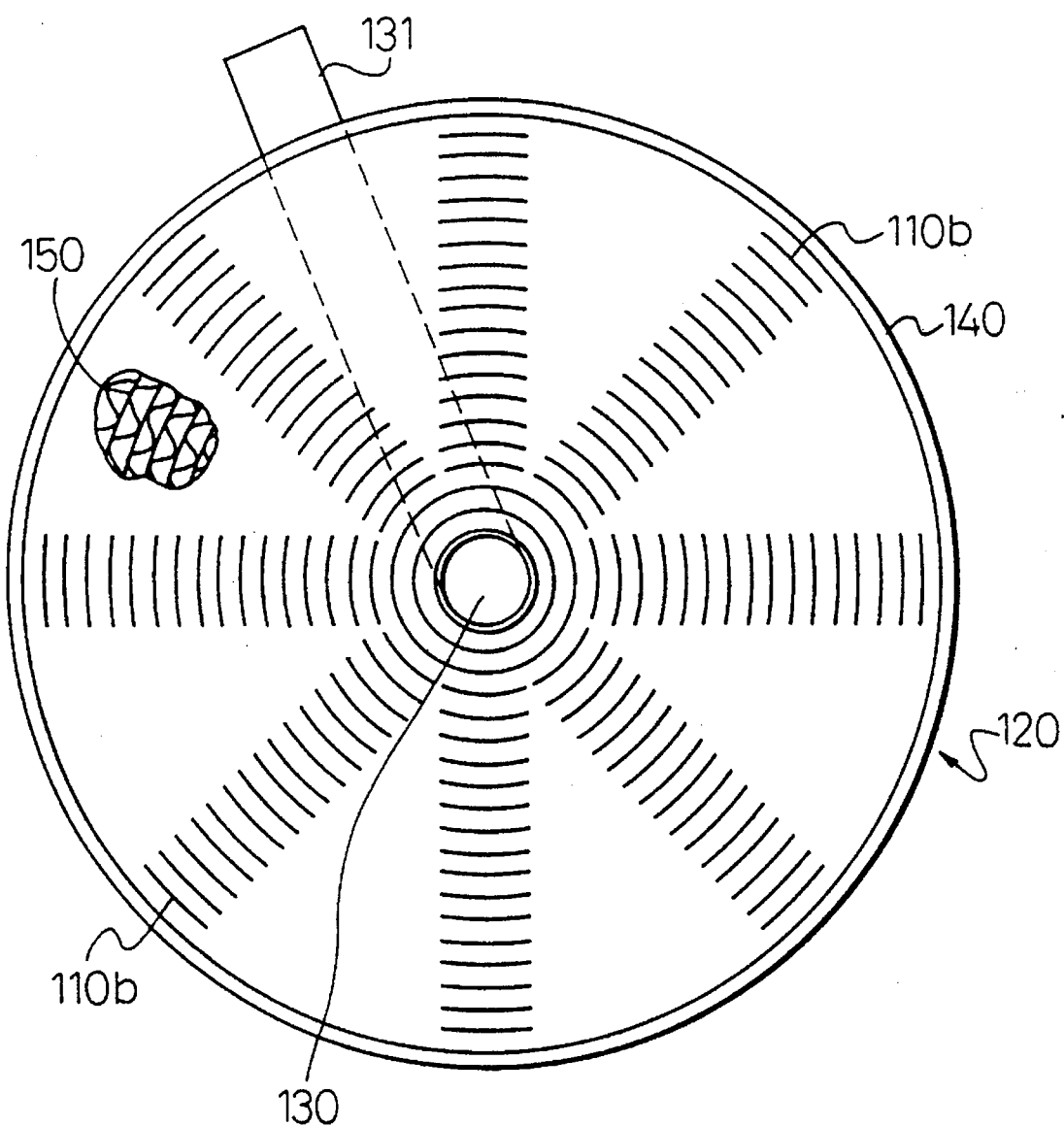
FIG. 13 is a plan view of a metallic carrier formed by the method shown in FIG. 12.

Then, the insulated heat resisting alloy corrugated foil 20b and the flat foil 40b of a heat resisting alloy were wound round the central electrode rod 130 to form a honeycomb structure 150 shown in FIG. 13. In this case, in the honeycomb structure 150, a joining material 70b comprising a strongly reducing metal foil 50b having a length of 10 mm, a width of 1 mm, and a thickness of about 5 µm and a 25 µm-thick brazing material foil 60b conforming to BNi-5 standard or the like was, in advance, properly arranged in a position, where the joint 110b was to be formed, in such a manner that the strongly reducing metal foil came into contact with the insulated foil of a heat resisting alloy. In the arrangement, it may be previously fixed to the heat resisting alloy foil 40b or the like prior to winding or alternatively successively inserted in the course of winding.

After completing the formation of the honeycomb structure 150, a jacket 140 is disposed outside the honeycomb structure, and the assembly is heat-treated in vacuo for brazing. The heat treatment is carried out at a temperature suitable for the composition of a brazing material (i.e., the melting temperature of a brazing material). For examples, in the case of a BNi-5-base brazing material (an Ni-19Cr-10Si-base brazing material), the heat treatment temperature is in the range of from about 1150° to 1250° C.

After the heat treatment, the end of the central electrode rod 130 is extended outside the jacket 140 (an extended electrode 131) to complete a metallic carrier 120. In this case, the extended electrode 131 and the jacket 140 should be electrically insulated from each other. After completing the preparation of the metallic carrier 120, a catalyst is supported on the honeycomb structure.

The insulated heat resisting alloy foil 20b and the heat resisting alloy foil 40b constituting the honeycomb structure 150 are insulated from each other and joined to each other at the joint 110b located on the side of an inlet for an exhaust gas. The size of one joint as viewed from the side of the inlet for an exhaust gas is, for example, such that the width and the depth are 10 mm and about 1 mm, respectively. The volume of the honeycomb structure 150 is, for example, suitably about 100 cc. The joint 110b of the metallic carrier thus formed has such a structure that an oxide of the strongly reducing metal is dispersed and precipitated.

When an exhaust gas is actually passed through the metallic carrier 120 simultaneously with the initiation of energization of the metallic carrier 120, the temperature of the joint 110b reaches the catalyst activation temperature in about 1 sec and an exothermic reaction occurs at the joint 110b. The periphery of the joint 110b is heated by the heat of reaction from the joint 110b, and the catalytically active region is rapidly spread, causing the temperature of the whole metallic carrier 120 to reach the catalyst activation temperature in a short time.

Figure 14:
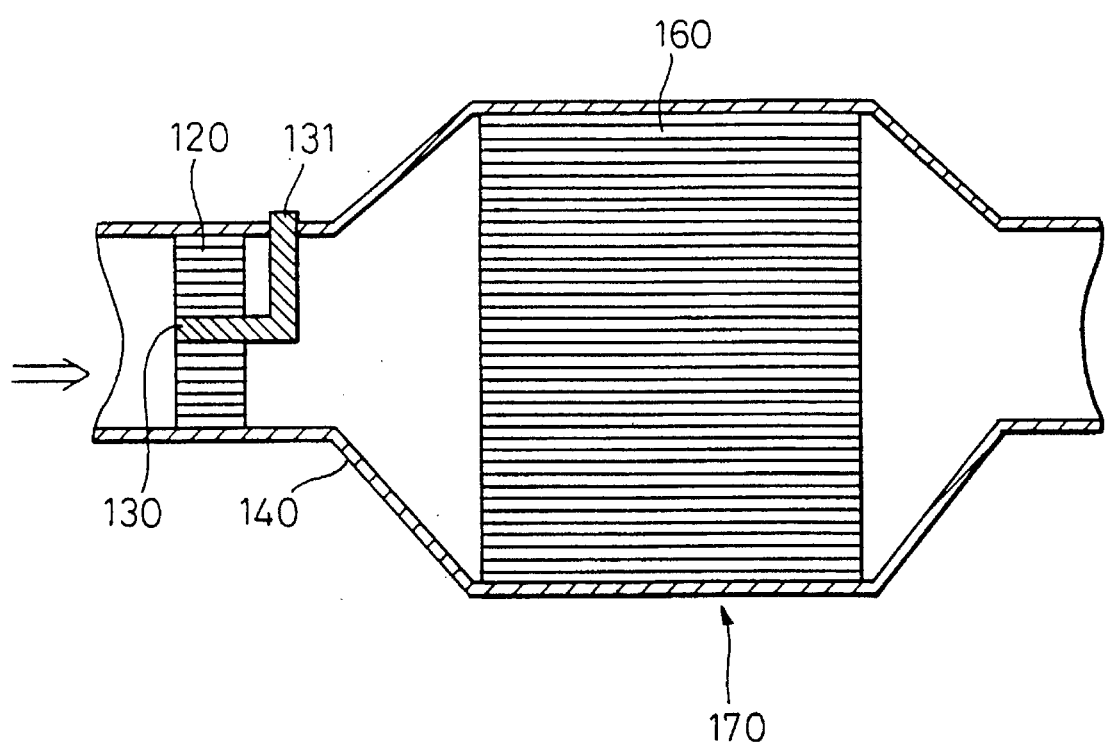
FIG. 14 is a sectional front view of a catalytic converter constructed of the metallic carrier of the present invention.

As shown in FIG. 14, the whole catalytic converter 170 has such a construction that a carrier 160 for a main catalyst having a volume of about 1000 cc is disposed behind the metallic carrier 120 prepared by the above process. The metallic carrier 120 disposed before the carrier 160 for a main catalyst, as such, has the function of purifying an exhaust gas and, at the same time, has the effect of shorting the time taken for the catalyst of the main catalyst carrier 160 to become active by virtue of an exhaust gas having a temperature elevated by the heat of reaction.

Example 5

Figure 1:
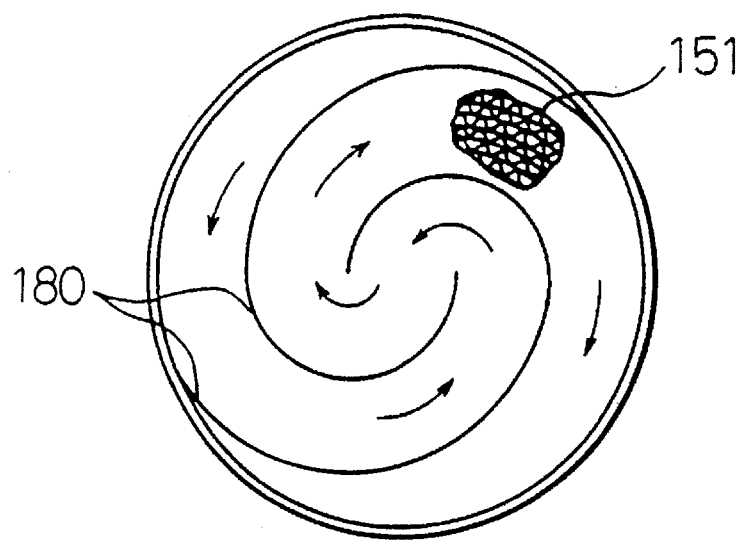
FIG. 1 is a plan view of the conventional preheat type metallic carrier.

A catalytic converter 170 provided with eight electrically conductive paths having a width of 10 mm and a depth of 1 mm and a metallic carrier 120 having a honeycomb structure with a capacity of 100 cc was subjected to the following test. An electric power of 750 W was applied across an electrode 130 and a jacket 140 to investigate the temperature elevating property and the conversion efficiency for hydrocarbons (HC) contained in an exhaust gas. The temperature elevating property was evaluated in terms of the time taken for the temperature of the joint 110b to reach 400° C., while the conversion efficiency was evaluated in terms of the conversion of HC 20 sec after the initiation of energization. For comparison, the temperature elevating property and the conversion efficiency were investigated also for a construction as shown in FIG. 1 wherein the whole honeycomb structure is heated with an electric power of 750 W being applied to a metallic carrier having a volume of 100 cc.

The test results are given in Table 1. For the metallic carrier for a catalyst according to the present invention, the joint 110b only generated heat about one sec after the initiation of energization, causing the temperature to reach about 400° C. The conversion of HC was 48% 20 sec after the initiation of energization and 33% when the system was not energized, indicating that a 50% improvement in HC conversion was attained. On the other hand, for the comparative example, about 12 sec was taken for the temperature to reach 400° C., and the conversion of HC was 37% which corresponds to only a 20% improvement over the conversion in the case where the system was not energized.

TABLE 1

|  | Metallic carrier according to the invention | | Comp. Ex. Electric |
| --- | --- | --- | --- |
|  | Electric power 750 W applied | No electric power applied | power 750 W applied |
| Heating volume | 3.2 cc | — | 100 cc |
| Time taken for the temp. to reach 400° C. | 1 sec | — | 12 sec |
| Conversion | 48% | 33% | 37% |

Example 6

The heat cycle of a metallic carrier 120 prepared in Example 4 according to the present invention was investigated. An ON-OFF cycle was repeated wherein the joint was heated by applying an electric power of 750 W for 10 sec and then cooled for 10 min. For comparison, the same test was carried out for a catalyst converter wherein electrically conductive paths were formed by laser beam welding of the end face of the honeycomb structure, as shown in FIG. 6.

The results are given in Table 2. For the metallic carrier of the present invention, the joint was not deteriorated even when the ON-OFF cycle was repeated 5000 times. By contrast, the tacking paths were burnt out when the ON-OFF cycle was repeated 10 times, making it impossible to energize the system.

TABLE 2

|  | Metallic carrier according to the invention | Comp. Ex. |
| --- | --- | --- |
| Heat cycle | Not less then 5000 cycles | 10 cycles |

Example 7

The same test as described in Example 4 was carried out with a joining material being selected for an oxide film and a Zr foil to be in contact with each other, for the case where an insulated heat resisting alloy foil was used as the flat sheet with a heat resisting alloy foil being used as the corrugated sheet, or the case where an insulated heat resisting alloy was used both as the flat sheet and the corrugated sheet. As a result, it was confirmed that the resultant honeycomb structure had substantially the same energization property and conversion efficiency of hydrocarbons as that prepared in Example 4.

Industrial Applicability

As described above, in the production of a metallic carrier having a high conversion efficiency and not requiring a high electric power, the present invention has enabled joining of an insulated heat resisting alloy which has been unattainable in the prior art. Therefore, only necessary portions can be joined where the formation of electrically conductive paths is contemplated, making it possible to prepare a metallic carrier for the purification of a preheat type exhaust gas that has a very high conversion efficiency.

We claim:

1. A preheat type metallic carrier for purification of exhaust gas, comprising:

a mutually laminated flat heat resisting alloy sheet and corrugated heat resisting alloy sheet, with at least one of said flat sheet and said corrugated sheet having an insulating film covering a surface thereof;

said mutually laminated flat sheet and corrugated sheet wound around a central elongated electrode member in a honeycomb structure form;

a brazed joint connecting selected portions of said flat sheet and said corrugated sheet in said honeycomb structure providing an electrically conductive path between said flat sheet and said corrugated sheet;

said brazed joint including oxides of a reducing metal that has a strong reducing action with respect to said insulting film, said reducing metal oxides being dispersed and precipitated in a solidified melted brazing metal;

said dispersed and precipitated reducing metal oxides being formed during brazing by heating a brazing material disposed in said honeycomb structure between said wound flat and corrugated sheets at said selected portions for the brazed joint, said brazing material comprising a brazing metal having said reducing metal laminated thereon, with said reducing metal facing said insulating film covering said surface of at least one of said flat sheet and said corrugated sheet, said heating melting said brazing metal and resulting in a substitution reaction between said reducing metal and said insulating film forming said reducing metal oxides which disperse and precipitate in the melted brazing metal; and said honeycomb structure wound around said central elongated electrode member being disposed in an outer jacket.

2. The preheat type metallic carrier according to claim 1 wherein said electrically conductive path connects said central elongated electrode member and said outer jacket for preheating said metallic carrier in response to an applied voltage.

3. A process for producing a preheat type metallic carrier for purification of exhaust gas comprising the steps of:

mutually laminating a flat heat resisting alloy sheet and a corrugated heat resisting alloy sheet, with at least one of said flat sheet and said corrugated sheet having an insulating film covering a surface thereof;

winding said mutually laminated flat sheet and corrugated sheet around a central elongated electrode member forming a honeycomb structure;

disposing a brazing material at selected locations between said flat sheet and said corrugated sheet of said honeycomb structure for forming a brazed joint, said brazing material comprising a reducing metal that has a strong reducing action with respect to said insulating film laminated on a brazing metal, said reducing metal facing said insulating film covering said surface of said at least one flat sheet and corrugated sheet;

inserting said honeycomb structure in an outer jacket forming the metallic carrier;

heating said metallic carrier in a non-oxidizing atmosphere followed by cooling thereby forming said brazed joint at said selected locations having said disposed brazing material, said heating melting said brazing metal and causing a substitution reaction between said reducing metal and said insulating film resulting in formation of an oxide of said reducing metal, said reducing metal oxide dispersing and precipitating in said molten brazing metal.

4. A method for brazing heat resisting alloys comprising the steps of:

forming an insulating film on the surface of a heat resisting alloy;

forming a joining material by laminating a reducing metal that has a strong reducing action with respect to said insulating film to one surface of a brazing metal;

forming a laminate by inserting the joining material between a heat resisting alloy with the insulating film formed on the surface thereof and a heat resisting alloy without an insulating film so that a surface of the reducing metal faces a surface of the insulating film;

heating the resultant laminate in a non-oxidizing atmosphere so as to melt the brazing metal and at the same time, causing a substitution reaction between said reducing metal and said insulating film resulting in forming of an oxide of said reducing metal by said substitution reaction, said formed reducing metal oxide dispersing and precipitating in said melted brazing metal; and cooling said laminate to join the heat resisting alloys to each other, thereby providing an electrically conductive resultant joint so as to permit flow of a current in the laminate through said joint.

5. The method for brazing heat resisting alloys according to claim 4, wherein said heat resisting alloy having insulating film on the surface thereof is produced by heating an Al-containing heat resisting alloy in an oxidizing atmosphere at a high temperature.

6. The method for brazing heat resisting alloys according to claim 4, wherein said reducing metal is at least one member selected from Zr, Li, Be, Mg, Ca, Sr, Sc, Y, or lanthanoid elements with atomic numbers of 57 to 71.

7. The method for brazing heat resisting alloys according to claim 4, wherein said heat resisting alloy having insulating film on the surface thereof or said heat resisting alloy without insulating film on the surface thereof is in a form of a sheet or a foil.

8. The method for brazing heat resisting alloys according to claim 4, wherein one of said heat resisting alloy having insulating film on the surface thereof and said heat resisting alloy without insulating film on the surface thereof is in a form of corrugated sheet.

9. The method for brazing heat resistant alloys according to claim 4, wherein said heat resisting alloy having insulating film on the surface thereof is produced by heating an Al-containing heat resisting alloy in an oxidizing atmosphere at a high temperature and said strongly reducing metal is at least one member selected from a group consisting of Zr, Li, Be, Mg, Ca, Sr, Sc, Y and lanthanoid elements with atomic number of 57 to 71.

10. A method for brazing heat resisting alloys comprising the steps of:

providing at least two heat resisting alloy members, each having a surface;

forming insulating film on the surface of each heat resisting alloy member;

forming a joining material by laminating a reducing metal that has a strong reducing action with respect to said insulating film to both surfaces of a brazing metal;

forming a laminate by inserting the joining material between said heat resisting alloy members, with the reducing metal facing the surfaces of said heat resisting alloy members having said insulating film formed thereon;

heating the resultant laminate in a non-oxidizing atmosphere to melt the brazing metal and at the same time, causing a substitution reaction between said reducing metal and said insulating film resulting in forming of an oxide of said reducing metal by said substutition reaction, said formed reducing metal oxide dispersing and precipitating in said melted brazing metal; and cooling said laminate to join said heat resisting alloy members to each other, thereby providing an electrically conductive resultant joint so as to permit flow of a current in the laminate through said joint.

11. The method for brazing heat resisting alloys according to claim 10, wherein each said heat resisting alloy member having insulating film on the surface thereof is produced by heating an Al-containing heat resisting alloy in an oxidizing atmosphere at a high temperature.

12. The method for brazing heat resisting alloys according to claim 10 wherein, said reducing metal is at least one member selected from Zr, Li, Be, Mg, Ca, Sr, Sc, Y, or lanthanoid elements with atomic numbers of 57 to 71.

13. The method for brazing heat resisting alloys according to claim 10, wherein each said heat resisting alloy member having insulating film on the surfaces thereof is in a form of a sheet or a foil.

14. The method for brazing heat resisting alloys according to claim 10, wherein one of said heat resisting alloy member having insulating film on the surface thereof is in a form of a corrugating sheet.

15. A laminate of heat resisting alloy members comprising:

a laminate formed by joining a structure comprising a first heat resisting alloy member with an insulating film disposed on a surface thereof and a second heat resisting alloy member without an insulating film disposed on a surface thereof, with a joining material inserted between said heat resisting alloy members, said joining material comprising a reducing metal that has a strong reducing action with respect to said insulating film laminated to a brazing metal, with said reducing metal facing the surface of said heat resisting alloy member having said insulating film disposed on the surface thereof, said joining being caused by heating said structure;

said laminate having a brazed joint between said first heat resisting alloy member and said second heat resisting alloy member formed by said heating of said structure, said brazed joint comprising oxides of said reducing metal dispersed and precipitated in solidified melted brazing metal, said oxides of said reducing metal being formed by a substitution reaction between said reducing metal and said insulating film on the surface of said first heat resisting alloy member occurring when said structure is heated and said brazing metal is melted;

said brazed joint being electrically conductive so as to permit flow of electric current in said laminate through said brazed joint.

16. A laminate of heat resisting alloy members comprising:

a laminate formed by joining a structure comprising a first heat resisting alloy member having an insulating film disposed on a surface thereof and a second heat resisting alloy member having an insulating film disposed on a surface thereof, with the surfaces of said heat resisting alloy members having said insulating film disposed thereon facing one another, a joining material disposed between said insulating film surfaces of said heat resisting alloy members, said joining material comprising a reducing metal that has a strong reducing action with respect to said insulating film laminated to both surfaces of a brazing metal, said reducing metal facing insulating film surfaces of said first and said second heat resisting alloy members, said joining being caused by heating said structure;

said laminate having a brazed joint between said first heat resisting alloy member and said second heat resisting alloy member formed by said heating of said structure, said brazed joint comprising oxides of said reducing metal dispersed and precipitated in solidified melted brazing metal, said oxides of said reducing metal being formed by a substitution reaction between said reducing metal and said insulating film on the surfaces of said first and second heat resisting alloy members occurring when said structure is heated and said brazing metal is melted;

said brazed joint being electrically conductive so as to permit flow of electric current in said laminate through said brazed joint.

* * * * *